May 14, 1935. F. A. SCHMIDT ET AL Re. 19,571

METHOD OF MANUFACTURING GARMENTS

Original Filed June 15, 1933 2 Sheets-Sheet 1

INVENTORS.
FOLKERT ALLEN SCHMIDT.
HENRY H. KRAMER.

BY

Lockwood Lockwood Goldsmith & Galt

ATTORNEYS.

May 14, 1935. F. A. SCHMIDT ET AL Re. 19,571

METHOD OF MANUFACTURING GARMENTS

Original Filed June 15, 1933 2 Sheets-Sheet 2

INVENTORS.
FOLKERT, ALLEN SCHMIDT.
HENRY H. KRAMER.

BY Lockwood Lockwood Goldsmith & Holt

ATTORNEYS.

Reissued May 14, 1935 Re. 19,571

UNITED STATES PATENT OFFICE 19,571

METHOD OF MANUFACTURING GARMENTS

Folkert Allen Schmidt and Henry H. Kramer, Terre Haute, Ind., assignors to Stahl-Urban Company, Terre Haute, Ind., a corporation Original No. 1,981,124, dated November 20, 1934, Serial No. 675,908, June 15, 1933. Application for reissue February 18, 1935, Serial No. 7,151

4 Claims. (Cl. 2—243)

This invention relates to a new and novel method of producing garments, such as trousers, coats, shirts, dresses and the like, and the structural assembly employed, whereby mass production thereof may be facilitated with less space and handling.

The invention may best be illustrated by its application to the manufacture of trousers from the time the pieces are cut and assembled for sewing until the completed trouser is produced ready for pressing and stocking.

The method of the development of the progressive line, which may be termed a gravity step progression, is the result of a certain division of the work, a corresponding arrangement of the machine sewing tables and particularly of the connecting delivery members between said tables.

Whereas, heretofore sewing machines and other work tables employed in the process of manufacturing garments have been arranged adjacent each other or disposed in a line along the side of a conveyor, it is proposed by this invention to join the tables in a progressive series, which series of tables constitute the conveyor itself associated with gravity chutes or other connecting members. Thus, wherein the usual conveyor arrangement caused the operators to divide their attention between the work in their hands and the delivery to them of the necessary garment parts from the conveyor, by means of the present method their attention may be uninterruptedly concentrated on the work in hand until completion, irrespective of delivery of new garment parts.

Furthermore, whereas formerly garment parts were handled in bundles or passed from one operation to another by a carrier or truck, necessitating rising and travel by the operators, by means of the present method, the garment parts are transmitted from one operation to another singly or in any desired grouping without requiring the operator to move from operative position.

One feature of the invention resides in the arrangement or grouping of the work tables in such order as to facilitate the progressive movement of each garment part from one work table to another, corresponding with the successive operations required in assembling the parts and producing a finished garment, without interfering cross currents or confusion.

Another feature of the invention resides in the method and means for transferring a garment piece from one operation to another, which comprises the utilization in most instances of a downwardly inclined chute with the receiving end at the level of one table and the delivery end below the level of the table performing the next operation at a point below the operator's wrist. Thus, upon completion of an operation, the operator need only give the garment a shove into the chute wherein it slides by gravity to a point under the wrist of the next operator who may conveniently remove it without changing operative position. It will also be noted that in this connection where the following operation may be delayed for any reason, the garments may accumulate in the chute without distracting the attention of the operator from the work being performed.

It is found to be necessary in some instances to employ a power driven conveyor in place of the gravity conveyors, as will be hereinafter more fully set forth and described.

The full nature of the invention will be understood from the accompanying drawings and the following description and claims:

Figures 1, 2, 3:
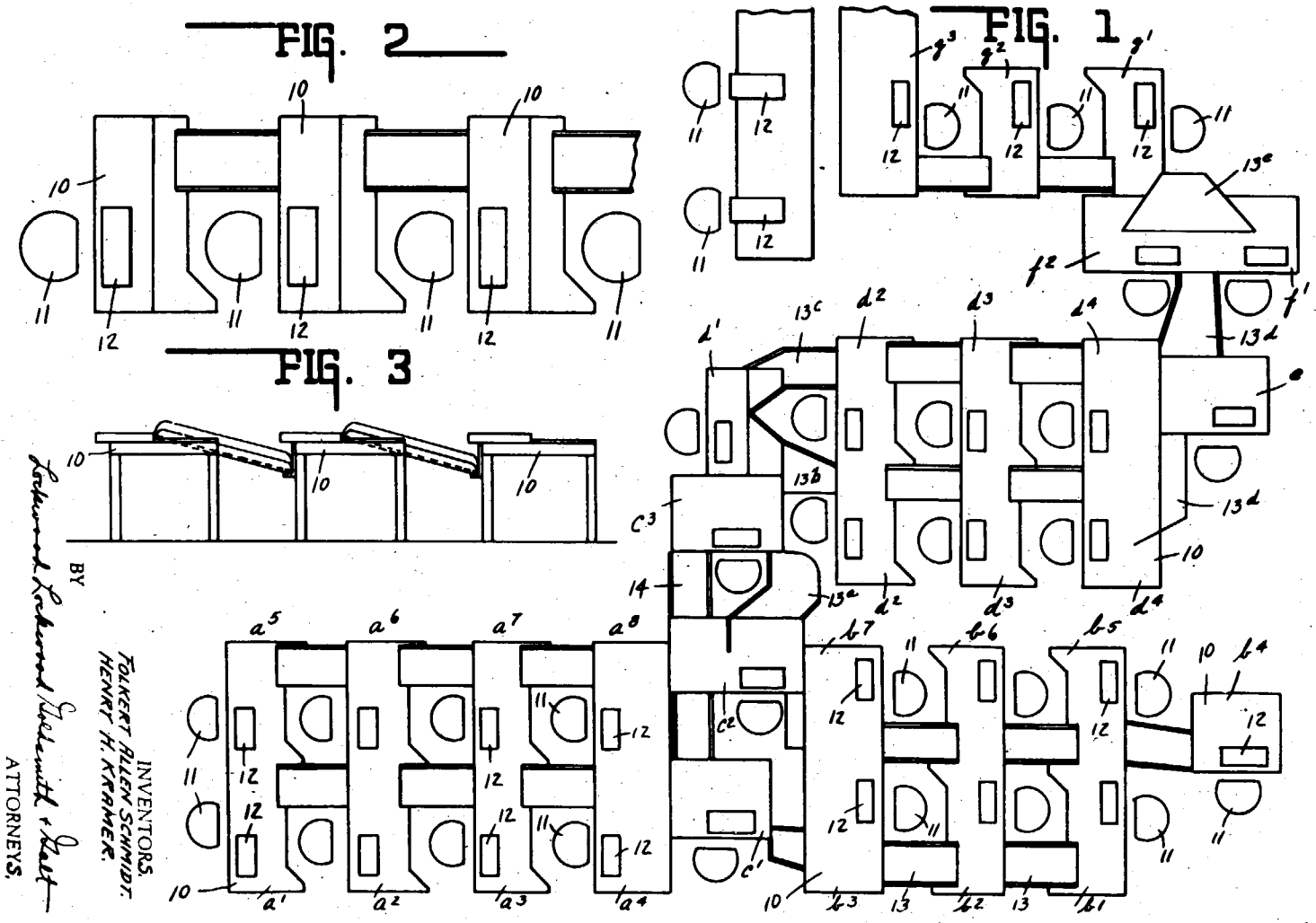
Fig. 1 is a plan view of a layout illustrating one arrangement of work tables.
Fig. 2 is an enlarged plan view of a smaller group of work tables illustrating the transfer chute.
Fig. 3 is the same as Fig. 2 showing a side elevation thereof.
Figure 4:
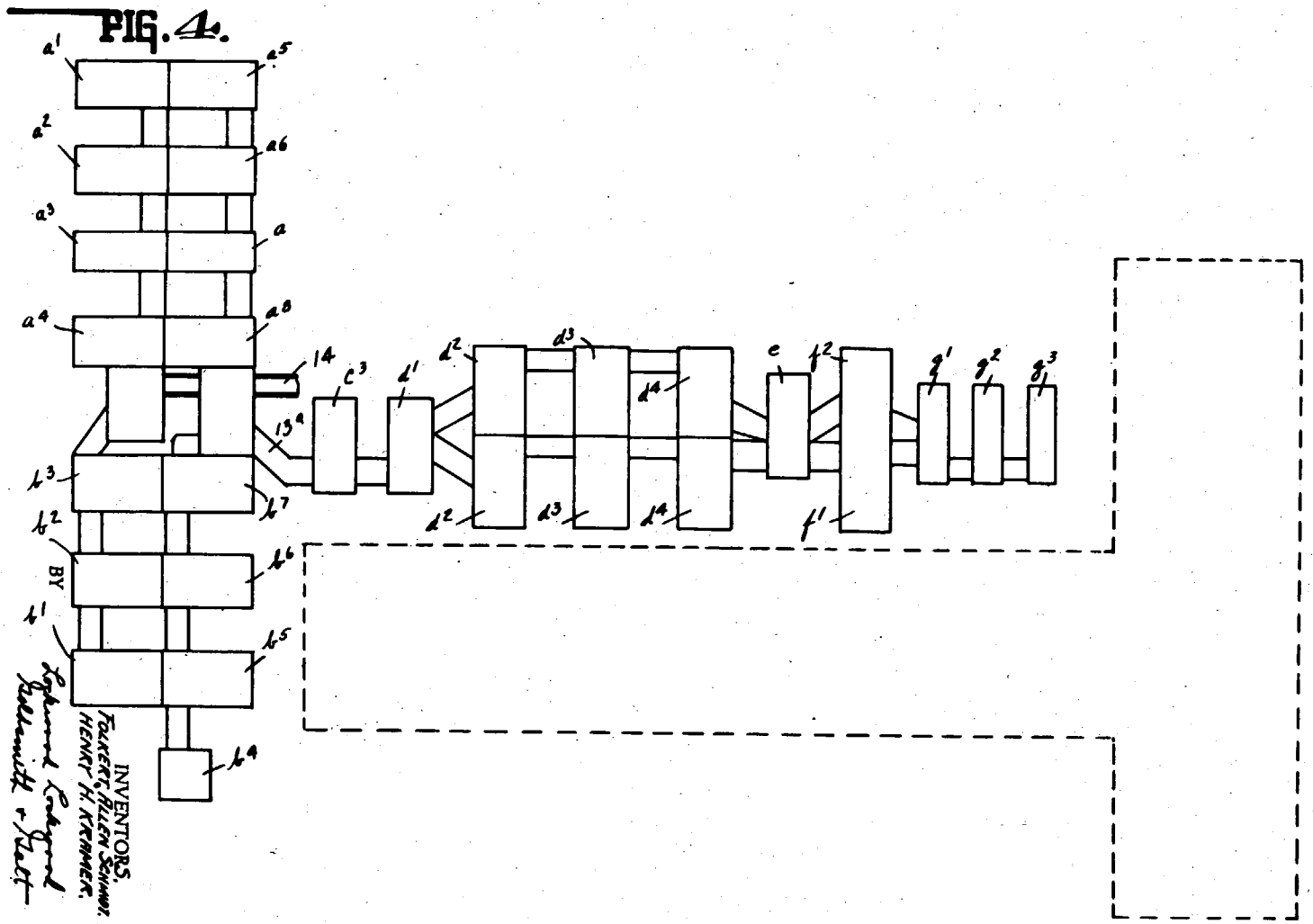
Fig. 4 is a modified form of layout or assembly of work tables.

In the drawings, as illustrated in Figs. 1 and 4, the work tables may be laid out or assembled in several different arrangements, depending upon the available floor space of the plant. Referring particularly to Fig. 1, there is shown a primary group of work tables 10 having the usual sewing machines 12 and the usual operator seats 11. Tables $a^1$ to $a^4$, inclusive, operate upon the back piece of the left trouser leg, the first operation being at table $a^1$. Tables $a^5$ to $a^8$, inclusive, operate upon the back part of the right trouser leg. Each table of the "$a$" group sews certain parts of these pieces, such as pockets. At the opposite side, the front pieces of the trouser legs start in, the tables $b^1$ to $b^3$, inclusive, sewing certain parts of the front piece of the left leg, while the tables $b^4$ to $b^7$, inclusive, operate upon the front piece of the right trouser leg.

Connecting the back side of each of the tables with the front of the next succeeding table there is a gravity chute 13 which is inclined to permit the garment placed therein to slide by gravity. The receiving end of the chute is at the far end of the table from the sewing machine and lies flush with the top so that the operator may readily slide the garment piece from the machine into the chute. It then slides down to a position under the wrist of the next operator so that it may be readily picked up and passed through the machine, after which it is again slid into the next chute to pass to the next operator. Thus, operator $a^1$ passes the garment to operator $a^2$ who in turn passes it to operator $a^3$ etc. At $a^4$ and $b^3$ the front and rear pieces of the left trouser leg are completed and are passed to the operator at table $c^1$ who joins them. Likewise the front and rear pieces of the right trouser leg are completed at the tables $a^8$ and $b^7$ and passed to the operator at table $c^2$ who joins the pieces to make the completed right trouser leg. The operator at table $c^2$ passes the right leg into the chute 13a which carries it to the work table $c^3$ on one side of the operator. The operator of table $c^1$ passes the left leg onto a power conveyor 14 which carries it to the work table $c^3$ on the other side of the operator. Thus, the operator at $c^3$ has the right trouser leg delivered on her right hand side while the left trouser leg is delivered on her left hand side. Thereupon she joins the two legs together and passes the same to work table $d^1$.

The group of "$d$" tables operate upon the waistband. The operation at work table $d^1$ being twice as fast as the operation of the other "$d$" tables, the operator places the trousers alternately in the chutes 13b and 13c. The waistband operations are then proceeded with as the trousers pass through their respective chutes from tables $d^2$ on down to tables $d^4$. From the far table $d^4$, the trousers are passed through chute 13d to work table $e$ and from the adjacent table $d^4$ directly onto work table $e$, where an operation employing a shorter length of time takes place. As the operation is completed on table $e$ the trousers are passed through chute 13d which carries them between tables $f^1$ and $f^2$ where a slower operation is performed, requiring two operators. From tables $f^1$ and $f^2$ the garments are placed in and passed through chute 13e which carries them to a group of "$g$" tables which are grouped in a single line, $g^1$, $g^2$ and $g^3$. In the same manner they may be carried to other tables where necessary and eventually discharged as completed garments.

The chutes 13 are removable so that the operator may lift them to have access to her position between the tables, the receiving end of the chute being recessed within the first table and flush therewith, inclining downwardly to a point adjacent the front of the second table. Said chutes may also be curved or extend laterally at an angle or as best suited for conveying the garments from one table to another, as illustrated.

It will be noted from the diagrammatic sketch, shown in Fig. 4, that the arrangement of the work tables is in the form of the letter T, disposed oppositely to each other to conserve space when the character of the floor plan permits, which is perhaps the most satisfactory system where possible.

From the foregoing it is obvious that one of the fundamental features of the invention resides in the organized intake of garment pieces or blanks into the system of operations. In delivery to the initial station from the cutter, the blanks are usually piled rights and lefts alternately, both front and rear sections, and these piles are placed at the stations of the initial operatives so that such operatives may remove alternately from such piles, those sections or blanks to be passed through the several proper steps.

We claim:

1. A method of manufacturing trousers comprising moving simultaneously from adjacent stations a pair of rear blanks consisting of lefts and rights to their respective intermediate stations, applying rear pockets to some of said blanks during their travel to said stations, moving simultaneously from oppositely disposed adjacent stations a pair of front blanks consisting of lefts and rights to said respective intermediate stations, forming a fly and applying side and watch pockets to some of said blanks during their travel to said intermediate stations, joining the left rear and front sections at one of said intermediate stations to provide the left trousers leg and joining the right rear and front sections at the other intermediate station to provide the right trousers leg, thereafter moving said trousers legs away from said intermediate stations to a common station, and uniting them into a pair of trousers.

2. A method of manufacturing trousers comprising moving simultaneously from adjacent points a pair of blanks consisting of left and right rear sections to predetermined locations, moving simultaneously from adjacent points a pair of blanks consisting of left and right front sections to said predetermined locations, performing preliminary minor assembly operations upon said leg blanks during their travel toward said locations, moving the said blanks away from said locations, and uniting the said blanks after they have left said locations.

3. A method of manufacturing trousers comprising moving simultaneously from adjacent stations a pair of rear blanks consisting of lefts and rights to their respective intermediate stations, moving simultaneously from oppositely disposed adjacent stations a pair of front blanks consisting of lefts and rights to said respective intermediate stations, performing preliminary minor assembly operations upon said blanks during their travel to said intermediate stations, joining the left rear and front sections at one of said intermediate stations to provide the left trousers leg and joining the right rear and front sections at the other intermediate station to provide the right trousers leg thereafter moving said trouser legs away from said intermediate stations to a common station, and uniting them into a pair of trousers.

4. A method of manufacturing garments having portions for covering the torso and at least two limbs and including right and left blanks, said method comprising moving a series of left blanks through certain stations toward a predetermined station, separately moving a series of right blanks through other certain stations toward another predetermined station, performing on each of said blanks during their travel minor assembly operations, moving toward said predetermined stations other sections of the garment to be united separately to said left and right blanks, performing on said other sections minor assembly operations during their travel to said predetermined stations, separately uniting said left and right blanks to said other sections at said separate predetermined stations, and moving said united left and right blanks and other sections through successive stations and performing thereon successively finishing operations.

FOLKERT ALLEN SCHMIDT.
HENRY H. KRAMER.